US012314870B2

(12) United States Patent
Baughman et al.

(10) Patent No.: US 12,314,870 B2
(45) Date of Patent: May 27, 2025

(54) DYNAMICALLY DETERMINING A REGION OF EFFECTIVENESS OF ATHLETES DURING GAME PLAY BASED ON PREDICTIVE FACTORS

(71) Applicant: INTERNATIONAL BUSINESS MACHINES CORPORATION, Armonk, NY (US)

(72) Inventors: Aaron K. Baughman, Silver Spring, MD (US); Stefan Van Der Stockt, Austin, TX (US); Craig M. Trim, Ventura, CA (US); John C. Newell, Austin, TX (US); Stephen C. Hammer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 1205 days.

(21) Appl. No.: 16/021,799

(22) Filed: Jun. 28, 2018

(65) Prior Publication Data

US 2020/0005165 A1    Jan. 2, 2020

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ........... G06N 5/04; G06N 20/00; G06N 20/10
See application file for complete search history.

(56) References Cited

U.S. PATENT DOCUMENTS

| 6,743,193 | B2 | 6/2004 | Brugger et al. |
| 7,183,480 | B2 | 2/2007 | Nishitani et al. |
| 9,153,035 | B2 | 10/2015 | Finocchio |
| 9,770,658 | B2 | 9/2017 | Bentley |
| 10,518,179 | B2 | 12/2019 | Sogabe et al. |

(Continued)

FOREIGN PATENT DOCUMENTS

| CN | 1885343 A | 12/2006 |
| CN | 1921915 A | 2/2007 |

(Continued)

OTHER PUBLICATIONS

Zhao Z, Xi J, Zhao X, Zhang G, Shang M. Evaluation of the Calculated Sizes Based on the Neural Network Regression. Mathematical Problems in Engineering. Jan. 1, 2018;2018:NA-. (Year: 2018).*

(Continued)

*Primary Examiner* — David Yi
*Assistant Examiner* — Leonard A Sieger
(74) *Attorney, Agent, or Firm* — Nicholas Welling; Andrew D. Wright; Calderon Safran & Wright P.C.

(57) ABSTRACT

A computer-implemented method includes monitoring, by a computing device, sensor data during gameplay of a sporting event; determining, by the computing device, predictive factors associated with a target based on the monitoring the sensor data; determining, by the computing device, a real-time region of effectiveness for the target based on the predictive factors and training data identifying historical effectiveness of the target; and outputting, by the computing device, the real-time region of effectiveness for displaying the real-time region of effectiveness around the target.

24 Claims, 11 Drawing Sheets

(56) References Cited

U.S. PATENT DOCUMENTS

| | | | | |
|---|---|---|---|---|
| 2011/0039624 | A1* | 2/2011 | Potkonjak | A63F 13/57 |
| | | | | 463/43 |
| 2014/0067098 | A1* | 3/2014 | Regan | G06T 7/20 |
| | | | | 700/91 |
| 2014/0114453 | A1 | 4/2014 | Bentley | |
| 2015/0084967 | A1 | 3/2015 | Finocchio | |
| 2015/0265920 | A1 | 9/2015 | Kim | |
| 2015/0328516 | A1* | 11/2015 | Coza | G09B 19/0038 |
| | | | | 473/446 |
| 2016/0250559 | A1 | 9/2016 | Sogabe et al. | |
| 2016/0328839 | A1 | 11/2016 | Aoki et al. | |
| 2017/0368439 | A1 | 12/2017 | Khazanov et al. | |
| 2018/0165978 | A1* | 6/2018 | Wood | G05B 19/0423 |
| 2018/0290019 | A1* | 10/2018 | Rahimi | G06K 9/6223 |
| 2019/0321727 | A1* | 10/2019 | Rodgers | A63F 13/50 |
| 2019/0366189 | A1* | 12/2019 | Plant | G06V 20/40 |

FOREIGN PATENT DOCUMENTS

| | | | | |
|---|---|---|---|---|
| CN | 105764582 | A | 7/2016 | |
| CN | 105828893 | A | 8/2016 | |
| JP | 2006-034717 | A | 2/2006 | |
| JP | 2006-204420 | A | 8/2006 | |
| JP | 2010-142339 | A | 7/2010 | |
| JP | 2015-112354 | A | 6/2015 | |
| WO | 2015/098420 | A1 | 7/2015 | |
| WO | WO-2017201608 | A1 * | 11/2017 | H04L 12/4625 |
| WO | 2020/003157 | A1 | 1/2020 | |

OTHER PUBLICATIONS

Tosun, Erdi, Kadir Aydin, and Mehmet Bilgili. "Comparison of linear regression and artificial neural network model of a diesel engine fueled with biodiesel-alcohol mixtures." Alexandria Engineering Journal 55.4 (2016): 3081-3089. (Year: 2016).*
Yale, "Multiple Linear Regression", 1998, http://www.stat.yale.edu/Courses/1997-98/101/linmult.htm (Year: 1998).*
Clemente et al., "Measuring tactical behaviour using technological metrics: Case study of a football game.", 2013, Int. J. Sports Sci. Coaching, vol. 8, pp. 723-739 (Year: 2013).*
Link et a., "Real time quantification of dangerousity in football using spatiotemporal tracking data", 2016, PLoS One, vol. 11(12), pp. 1-16 (Year: 2016).*
Kim et al., "Augmented reality-based remote coaching for fast-paced physical task", Mar. 2018, Virtual Reality, vol. 22, pp. 25-36 (Year: 2018).*
Stein et al., "Bring it to the Pitch: Combining Video and Movement Data to Enhance Team Sport Analysis", Jan. 2018, IEEE Transactions on Visualization and Computer Graphics, vol. 24, No. 1, pp. 13-22 (Year: 2018).*
Link et al., "Real time quantification of dangerousity in football using spatiotemporal tracking data", 2016, PLoS One, vol. 11(12), pp. 1-16 (Year: 2016).*
Silva et al., "Numerical Relations and Skill Level Constrain CoAdaptive Behaviors of Agents in Sports Teams", 2014, PLoS One, vol. 9(9), pp. 1-12 (Year: 2014).*
Mlakar et al., "Analyzing Tennis Game through Sensor Data with Machine Learning and Multi-Objective Optimization", 2017, ACM International Joint Conference on Pervasive and Ubiquitous Computing and Proceedings of the 2017 ACM International Symposium on Wearable Computers, vol. 2017, pp. 153-156 (Year: 2017).*
Enright et al., "Reference Equations for the Six-Minute Walk in Healthy Adults", 1998, American Journal of Respiratory and Critical Care Medicine, vol. 158, pp. 1384-1387 (Year: 1998).*
Weiss et al., "Using Velocity-Spectrum Squats and Body Composition to Predict Standing Vertical Jump Ability", 1997, Journal of Strength and Conditioning Research, vol. 11(1), pp. 14-20 (Year: 1997).*
Zhu et al., "Player Action Recognition in Broadcast Tennis Video with Applications to Semantic Analysis of Sports Game", 2006, Proceedings of the 14th ACM international conference on Multimedia, vol. 14(2006), pp. 431-440 (Year: 2006).*
Tanaka et al., "MIKE: an automatic commentary system for soccer", 1998, Proceedings International Conference on Multi Agent Systems, vol. 1998, pp. 285-292 (Year: 1998).*
Wei, "Modelling and Predicting Adversarial Behaviour using Large Amounts of Spatiotemporal Data", 2016, Thesis, Queensland University of Technology (Year: 2016).*
Horton et al., "Automated Classification of Passing in Football", 2015, Pacific-Asia Conference on Knowledge Discovery and Data Mining, vol. 2015, pp. 319-330 (Year: 2015).*
Wei et al., "Forecasting the Next Shot Location in Tennis Using Fine-Grained Spatiotemporal Tracking Data", 2016, IEEE Transactions on Knowledge and Data Engineering, vol. 28 No. 11, pp. 2988-2997 (Year: 2016).*
Niu et al., "Tactic analysis based on real-world ball trajectory in soccer video", 2012, Pattern Recognition, vol. 45 No. 5, pp. 1937-1947 (Year: 2012).*
Wei et al., "Predicting Serves in Tennis using Style Priors", 2015, KDD '15: Proceedings of the 21th ACM SIGKDD International Conference on Knowledge Discovery and Data Mining, vol. 21 (2015), pp. 2207-2215 (Year: 2015).*
Carneiro et al., "The role of early anticipations for human-robot ball catching", Jun. 7, 2018, 2018 IEEE International Conference on Autonomous Robot Systems and Competitions (ICARSC), vol. 2018, pp. 10-16 (Year: 2018).*
Gudmundsson et al., "Football Analysis Using Spatio-Temporal Tools", 2014, Computers, Environment, and Urban Systems, vol. 47, pp. 16-27 (Year: 2014).*
Floyd, "Applying Multi-Resolution Stochastic Modeling to Individual Tennis Points", 2017, Thesis, Rochester Institute of Technology (Year: 2017).*
Kim et al., "Catching Objects in Flight", 2014, IEEE Transactions on Robotics, vol. 30 No. 5, pp. 1049-1065 (Year: 2014).*
Jamone et al., "Learning the reachable space of a humanoid robot: A bio-inspired approach", 2012, 2012 4th IEEE RAS & EMBS International Conference on Biomedical Robotics and Biomechatronics (BioRob), vol. 4 (2012), pp. 1148-1154 (Year: 2012).*
Taki et al., "Visualization of Dominant Region in Team Games and Its Application to Teamwork Analysis", 2000, Proceedings Computer Graphics International 2000, vol. 2000, pp. 1-9 (Year: 2000).*
Mlakar et al., "Analyzing tennis game through sensor data with machine learning and multi-objective optimization", 2017, Proceedings of the 2017 ACM International Joint Conference on Pervasive and Ubiquitous Computing, vol. 2017, pp. 153-156 (Year: 2017).*
Chawla et al., "Classification of Passes in Football Matches Using Spatiotemporal Data", 2017, ACM Transactions on Spatial Algorithms and Systems, vol. 3 Issue 2, pp. 1-30 (Year: 2017).*
Knudsen et al., "Detection of Spatiotemporal Asymmetry in Pro Level Soccer Players", Mar. 2018, Journal of Strength and Conditioning Research, vol. 32(3), pp. 798-804 (Year: 2018).*
Rein et al., "Which pass is better?' Novel approaches to assess passing effectiveness in elite soccer", 2017, Human Movement Science, vol. 55, pp. 172-181 (Year: 2017).*
Wei et al.; Predicting Shot Locations in Tennis using Spatiotemporal Data; Nov. 2013; 9 pages.
IBM at Wimbledon 2018, https://www.ibm.com/sports, Accessed Jun. 26, 2018; 12 pages.
I can change the game for athletes and fans with IoT and sports analytics, https://www.ibm.com/internet-of-things/spotlight/iot-zones/sports-analytics, IBM Watson Internet of Things, Accessed Jun. 26, 2018; 7 pages.
Bodo, "How does Roger Federer do it after all these years?", http://www.espn.com/tennis/story/_/id/22066810/australian-open-blueprint-old-man-roger-federersuccess, Jan. 13, 2018, 6 pages.
"How to Master the Perfect Jab Step: Basketball Moves for Beginners", https://www.youtube.com/watch?v=PJb2kvW_A_Eh, YouTube, Sep. 15, 2017, 3 pages.
Prisacariu et al., "Simultaneous 3D tracking and reconstruction on a mobile phone", https://ieeexplore.ieee.org/document/6671768/, 2013 IEEE International Symposium on Mixed and Augmented Reality (ISMAR), Dec. 23 Dec. 23, 2013, 10 pages.

(56) References Cited

OTHER PUBLICATIONS

Roh et al., "Volume Motion Template for View-Invariant Gesture Recognition", https://ieeexplore.ieee.org/document/1699431/, 18th International Conference on Pattern Recognition (ICPR'06), Sep. 18, 2006, 4 pages.
Shan et al., "Adaptive Slice Representation for Human Action Classification", https://ieeexplore.ieee.org/document/6967815/, Nov. 26, 2014, 13 pages.
Conti et al., "Enabling the "Internet of Places": a virtual structure of space-time-tasks to find and use internet resources", https://dl.acm.org/citation.cfm?id=1999329, May 23, 2011, 8 pages.
Benitez et al., "IMKA: a multimedia organization system combining perceptual and semantic knowledge", https://dl.acm.org/citation.cfm?id=500267, Oct. 1, 2001, 2 pages.
Chatterjee et al., "A Distributed Selectors Runtime System for Java Applications", https://dl.acm.org/citation.cfm?id=2972215, Aug. 9, 2016, 11 pages.
International Search Report and Written Opinion issued in corresponding application No. PCT/IB2019/055399, dated Oct. 22, 2019, 9 pages.
Elkington and Fife, Response for GB Application No. GB2100856.0 dated May 10, 2022, 4 pages.
UK Intellectual Property Office, Examination Report from GB Application No. GB2100856.0 dated Apr. 11, 2022, 7 pages.
First Examination Department natural-resources, Notice of Reasons for Refusal, JP Application No. 2020-563623 dated Jul. 19, 2022, 3 pages.
UK Intellectual Property Office, Response to Examination Report from GB Application No. GB2100856.0 dated Aug. 15, 2022, 2 pages.
UK Intellectual Property Office, Examination Report from GB Application No. GB2100856.0 dated Sep. 7, 2022, 4 pages.
UK Intellectual Property Office, Examination Report from GB Application No. GB2100856.0 dated Jul. 4, 2022, 4 pages.
Japan Patent Office, "Notice of Reasons for Refusal," Jul. 26, 2022, 6 Pages, JP Application No. 2020-563623.
The State Intellectual Property Office of People's Republic of China, "Second Office Action," Oct. 24, 2024, 13 Pages, CN Application No. 201980035924.6.

\* cited by examiner

DYNAMICALLY DETERMINING A REGION OF EFFECTIVENESS OF ATHLETES DURING GAME PLAY BASED ON PREDICTIVE FACTORS

BACKGROUND

The present invention generally relates to dynamically determining a region of effectiveness of athletes during game play and, more particularly, to dynamically determining a region of effectiveness of athletes during game play based on predictive factors.

During game play of some athletic sports (e.g., tennis), one player attempts to score a point against an opponent by shooting the ball within the boundaries of a court and in a location that minimizes the chances of the opponent returning the ball. In other words, one player attempts to shoot the ball in such a way as to minimize the opponent's effectiveness in returning the ball. There is an area around each player where they are most active. This area is continually changing as the athlete/player adapts to circumstances on the field or court.

SUMMARY

In an aspect of the invention, a computer-implemented method includes: monitoring, by a computing device, sensor data during gameplay of a sporting event; determining, by the computing device, predictive factors associated with a target based on the monitoring the sensor data; determining, by the computing device, a real-time region of effectiveness for the target based on the predictive factors and training data identifying historical effectiveness of the target; and outputting, by the computing device, the real-time region of effectiveness for displaying the real-time region of effectiveness around the target. In a further aspect of the invention, the method includes updating the real-time region of effectiveness for the target based on continued monitoring of the sensor data; and continuously outputting updates to the real-time region of effectiveness for continuously displaying the updates to the real-time region of effectiveness. In a further aspect of the invention, the training data includes a training record identifying an effectiveness of a play and a particular set of predictive factors associated with the effectiveness of the play. Advantageously, aspects of the present invention determine and present the real-time region of effectiveness to improve spectator experience and improve evaluation of athlete gameplay and technique.

In an aspect of the invention, there is a computer program product for training a machine learning system to determine and display a real-time volume of effectiveness of a target. The computer program product comprising a computer readable storage medium having program instructions embodied therewith, the program instructions executable by a computing device to cause the computing device to: monitor sensor data during gameplay of a sporting event; determine an effectiveness of a play made by a target; determine a dataset of predictive factors associated with a target based on the monitoring the sensor data; generate and store a training data record that associates the effectiveness of the play with the dataset of predictive factors; determine a dataset of real-time predictive factors based on the monitoring the sensor data; determine the real-time volume of effectiveness for the target based on the dataset of real-time predictive factors and the generating the training data record; and output the real-time volume of effectiveness for displaying the real-time volume of effectiveness around the target. In a further aspect of the invention, the real-time volume of effectiveness is a volume of a cylinder, wherein a radius of the volume of the cylinder is determined based on a first regression equation and a height of the cylinder is based on a second regression equation. Advantageously, aspects of the present invention trains a machine learning system used to determine an individualized volume of effectiveness to improve spectator experience and improve evaluation of athlete gameplay and technique.

In an aspect of the invention, a system includes: a processor, a computer readable memory and a computer readable storage medium associated with a computing device; program instructions to monitor sensor data during gameplay of a sporting event; program instructions to determine a volume of effectiveness for a primary target based on the monitoring the sensor data and a first set of predictive factors associated with the primary target; program instructions to determine a volume of effectiveness for a secondary target based on the monitoring the sensor data and a second set of predictive factors associated with the secondary target; program instructions to determine a third set of predictive factors associated with the secondary target that minimize the volume of effectiveness for the secondary target; program instructions to determine one or more suggested actions for the primary target to introduce the third set of predictive factors and minimize the volume of effectiveness for the secondary target; and program instructions to display the volume of effectiveness for the primary target, the volume of effectiveness for the secondary target, and the suggested actions. The program instructions are stored on the computer readable storage medium for execution by the processor via the computer readable memory. In a further aspect of the invention, the system further includes program instructions to determine and display a narrative describing the volume of effectiveness for the primary target, the volume of effectiveness for the secondary target, or the suggested actions using natural language generation. In a further aspect of the invention, the primary target is an athlete of the sporting event, the secondary target is an opponent athlete, and the sporting event is tennis. Advantageously, aspects of the present invention determine and present the real-time region of effectiveness along with corresponding auto-generated commentary to improve spectator experience and improve evaluation of athlete gameplay and technique.

In an aspect of the invention, a computer-implemented method includes generating, by a computing device, a plurality of training data records for a target of a sporting event, wherein the training data records each identify a measure of effectiveness of a play made by the target, and a dataset of historical predictive factors associated with each measure of effectiveness; monitoring, by the computing device, sensor data of the sporting event in real time; determining, by the computing device, a dataset of real-time predictive factors for the target based on the monitoring the sensor data; determining, by the computing device, a real-time volume of effectiveness for the target based on the dataset of real-time predictive factors and the generating the plurality of training data records; and outputting, by the computing device, the real-time volume of effectiveness for displaying the real-time volume of effectiveness around the target. In a further aspect of the invention, the real-time volume of effectiveness is a volume of a cylinder, wherein a radius of the volume of the cylinder is determined based on a first regression equation and a height of the cylinder is based on a second regression equation. Advantageously, aspects of the present invention maintain training records used to determine and present the real-time region of effectiveness to improve spectator experience and improve evaluation of athlete gameplay and technique.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
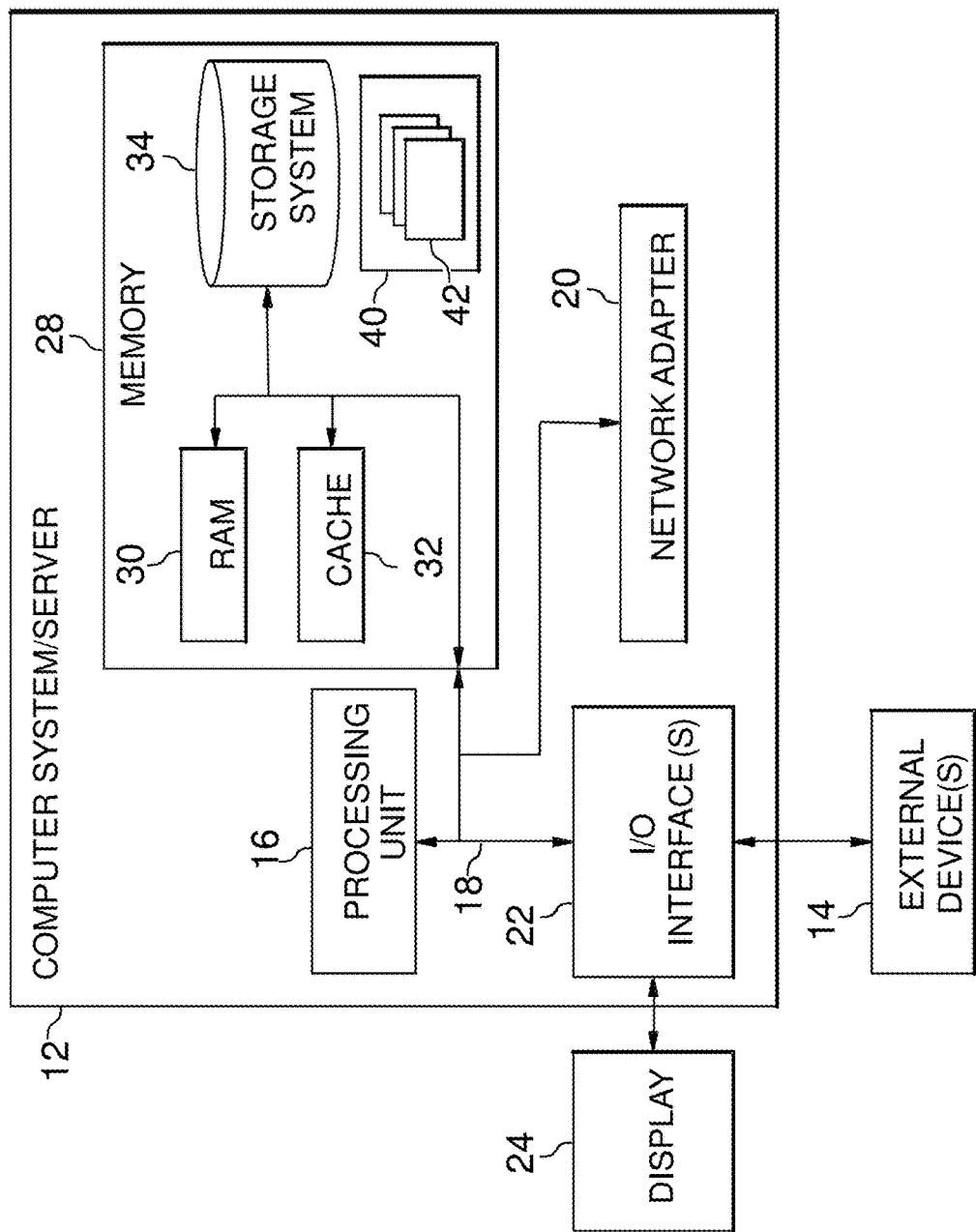
FIG. 1 shows a computer infrastructure in accordance with aspects of the invention.

The present invention generally relates to dynamically determining a region of effectiveness of athletes during game play and, more particularly, to dynamically determining a region of effectiveness of athletes during game play based on predictive factors. Aspects of the present invention dynamically determines a region of effectiveness of targets (e.g., athletes) during gameplay of an athletic sport (e.g., tennis). Aspects of the present invention displays the region of effectiveness (also referred to herein as an "area of effectiveness" or a "volume of effectiveness") in real-time during game play. As described herein, in an aspect of the invention the region of effectiveness represents an area or a volume surrounding a target (e.g., athlete) in which the athlete is considered to be "effective" (e.g., make an effective "play" that has a high likelihood to score a point against an opponent or defend against a point being scored against the athlete by an opponent). Using the game of tennis as an illustrative example, a "play" is considered to be an event in which the athlete is tasked with returning the ball to the opponent in an attempt to score a point against the opponent.

In embodiments, a volume of effectiveness is the volume of a cylinder (or any other variety of shapes) having a particular radius around the athlete. As described herein and in accordance with an embodiment of the invention, the volume of effectiveness is determined based on a variety of predicting factors, situational data, sequential data, biometrics data associated with the athlete, and/or the effectiveness of prior plays made by the athlete. Using the game of tennis as an illustrative example, the "effectiveness" of a play may relate to whether the play leads to the scoring of a point by the athlete, or a successful defense against a point being scored against the athlete by the opponent. As described herein, the volume of effectiveness is determined based on the effectiveness of prior plays and predictive factors, such as the athlete's body's position/orientation, the athlete's momentum and running direction at a given time, the athlete's initial and ending velocity during a play, the athlete's maximum and mean acceleration, the athlete's angle of direction/trajectory and changes in direction/trajectory, the trajectory of the ball, the athlete's forehand swing or backhand swing position, the athlete's level of fatigue, the athlete's position on the court, etc. As described herein, the predictive factors are gathered using a set of sensor devices (including cameras, motion sensors, object sensors, etc.) that are distributed in an athletic setting (e.g., around a court, field, etc.) and/or worn by the athlete.

As described herein, the predictive factors are used to determine unknown variables in a volume equation for a particular shape (e.g., $V=\pi r^2 h$ for a cylinder). In the case of a cylinder, the predictive factors are used to determine values for the radius and height to derive the volume of effectiveness. As described herein, historical data and/or training data records are used to determine the predictive factors which may then be used to determine the unknown variables in a volume equation to determine the volume of effectiveness. The training data may be updated periodically to more accurately determine the volume of effectiveness. That is, machine learning and cognitive computing techniques are used to train a machine learning system to accurately determine a target's volume of effectiveness at any given time based on the predictive factors associated with the target.

In embodiments, the training data includes data records that associate predictive factors with the effectiveness of a play. As such, aspects of the present invention obtain information regarding predictive factors from one or more sensor devices to derive the effectiveness of the play from historical training data and determine the volume of effectiveness. In an example use case in accordance with an embodiment of the invention, the volume of effectiveness is viewable in real-time to enhance spectator viewing experience and can be replayed at a later time and used to allow athletes and coaches to evaluate, adjust, and improve technique.

As described herein, an athlete's volume of effectiveness is determined using a set of predictive factors. In the same vein, aspects of the present invention determine actions an athlete may take in order to create a situation in which predictive factors that minimize the volume of effectiveness for an opponent are introduced during game play (e.g., minimize an effectiveness of an opponent's "redirect step" when re-directing to make a play). As described herein, a "redirect step" may refer to a movement or a series of movements that alters a direction in which a player is moving. The movements could be the shortening or lengthening of steps (e.g., shorter steps versus long strides), lateral movements (e.g., a shuffle), a lunge (e.g., when reaching for a drop shot), (back-peddling (e.g., for situations where the player is at the net for a volley and the opponent has "lobbed" the ball over the player's head). In other words, aspects of the present invention determine actions an athlete may take in order to minimize their opponent's volume of effectiveness and minimize the opponent's chances to score a point or defend against a play made by the athlete. That is, aspects of the present invention determine that an opponent's volume of effectiveness is lowest given a particular set of predictive factors. Accordingly, aspects of the present invention provide suggested actions/shot selections an athlete may take such to those predictive factors are introduced at a particular moment during gameplay, thus minimizing the opponent's volume of effectiveness.

As an illustrative example, aspects of the present invention determine that at a given point in a tennis match, an athlete should aim to shoot the ball to a particular position in the court, towards the opponent's backhand swing, etc., as these actions would result in the occurrence of predictive factors that minimize the opponent's volume of effectiveness. That is, aspects of the present invention determine suggested actions would result the opponent being in a "weak" position, the opponent needing to take a difficult trajectory to make the play, the opponent needing to take a difficult "redirect step," the opponent needing to use a weaker type of swing (e.g., backhand swing), the opponent needing to travel a relatively long distance to make a play, the opponent needing to have a particular momentum and direction to make a play, etc.

In embodiments, the volume of effectiveness is generated in any variety of shapes (e.g., a cube, cylinder, rectangular prism, etc.). Different shapes are used for different athletes, preferences, and objectives. In embodiments, aspects of the present invention determine a volume of effectiveness for multiple different shapes, and a user may select which shape to display for the volume of effectiveness.

In embodiments, aspects of the present invention use the volume of effectiveness to predict where an athlete is likely predicted to be during game play based on predictive factors, such as ball trajectory. For example, aspects of the present invention predicts that the athlete is within the volume of effectiveness. Additionally, or alternatively, the volume of effectiveness represents where the athlete should be to have the highest chance of success, and similarly, actions the athlete can take to minimize the chance of success of their opponent.

As described herein, in an example use case, aspects of the present invention generate narratives based on the determination of the volume of effectiveness and/or the determination of actions that an athlete can take to minimize an opponent's volume of effectiveness. For example, aspects of the present invention use natural language generation (NLG) techniques to generate narratives that describe situations that are based on a volume of effectiveness and corresponding predictive factors (e.g., to generate automated play-by-play analysis). As an illustrative example, aspects of the present invention generates the narrative "Player A has been exceptional at returning balls after 5 rounds of rallying and when hit to his forehand."

While aspects of the present invention are described in terms of determining the volume of effectiveness for the game of tennis, aspects of the present invention are not so limited. For example, aspects of the present invention may be applied to other sports or recreational activities, such as baseball, basketball, boxing/kickboxing, golf, frisbee, kite-flying, billiards, table tennis, polo, soccer, football, etc. Further, aspects of the present invention may be applied to either single or doubles tennis such that analysis can be performed to determine situations in which one player over another is best positioned to make a play. Also, aspects of the present invention are used for determining any region of effectiveness (e.g., an area of effectiveness rather than a volume of effectiveness for a two-dimensional analysis versus a three-dimensional analysis). As such, similar processes for determining a volume of effectiveness can be used to determine an area of effectiveness.

Aspects of the present invention provide a technical solution to the technical problem of determining a volume of effectiveness for an athlete by determining unknown variables in a volume equation to determine a volume measurement. As described herein, regression techniques are used to determine the unknown variables in the volume equation. Further, technical solutions involving machine learning and cognitive computing techniques are used to solve the technical problem of accurately determining predictive factors for an athlete, which are in turn used to determine a volume of effectiveness. In embodiments, aspects of the present invention generate a user interface or modify an existing user interface to display and show athlete movements and effective range/volume of effectiveness. Aspects of the present invention improve user interface technology by implementing a predictive system that displays the effectiveness, predicted movements, and related simulations on the user interface.

Aspects of the present invention provide a specific implementation to solve a specific problem, namely the use of machine learning and cognitive computing to solve the problem of determining a volume of effectives of an athlete and minimizing the volume of effectiveness of the athlete's opponent. In the professional sports world setting, a real-world and specific problem is solved using the specific solution of aspects of the present invention. Further, aspects of the present invention improve the manner in which data is processed for providing the specific solution to the specific problem described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computing node and is not intended to suggest any limitation as to the scope of use or functionality of embodiments of the invention described herein. Regardless, computer infrastructure 10 is capable of being implemented and/or performing any of the functionality set forth hereinabove In computer infrastructure 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in computer infrastructure 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
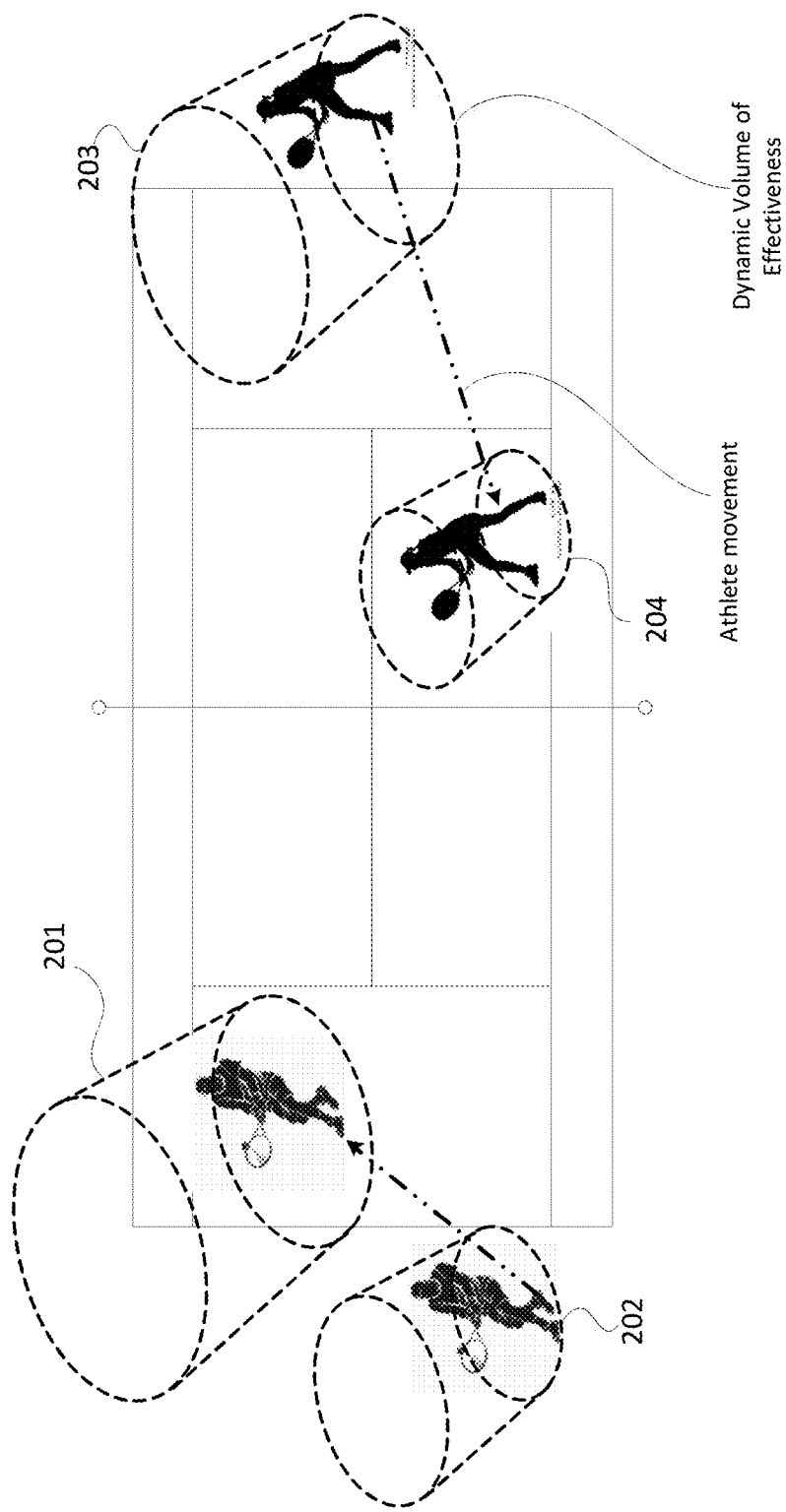
FIG. 2 shows an overview of an example implementation in accordance with aspects of the present invention

FIG. 2 shows an overview of an example implementation in accordance with aspects of the present invention. As shown in FIG. 2, a volume of effectiveness is determined during play of a sporting event (e.g., tennis) for each athlete at a given time. For example, as gameplay progresses, the athletes move around, and predictive factors continuously change based on the athlete's trajectory, ball trajectory, athletes' momentum, athletes' acceleration, athletes' velocities, athlete's etc. As can be seen in FIG. 2, the volume of effectiveness dynamically changes based on the changing predictive factors as gameplay progresses. In the example of FIG. 2, at one moment in time, an athlete has one volume of effectiveness (e.g., volume of effectiveness 201) and at another moment in time (e.g., after the athlete has moved), the same athlete has a different volume of effectiveness (e.g., volume of effectiveness 202). Similarly, at one moment in time, an opponent has one volume of effectiveness (e.g., volume of effectiveness 203) and at another moment in time (e.g., after the opponent has moved), the same opponent has a different volume of effectiveness (e.g., volume of effectiveness 204).

In embodiments, the volume of effectiveness is included in a live broadcast of the sporting event. As an example use case in accordance with an aspect of the invention, the volume of effectiveness is superimposed over a live video broadcast of the athletes in a similar manner shown in FIG. 2. Additionally, or alternatively, in an example embodiment, a user device runs an application that graphically represents the athletes as well as the volume of effectiveness in real time. In this way, spectator experience is improved by providing spectators with greater insight as to how gameplay affects the athletes' effectiveness. Further, in embodiment, gameplay video with the volume of effectiveness is stored and replayed at a later time to allow athletes and coaches to evaluate, adjust, and improve technique. Moreover, predictive factors associated with the volume of effectiveness can be stored to allow athletes and coaches to evaluate and gain insight as to what predictive factors maximized an athlete's volume of effective ness and what predictive factors minimized their opponent's volume of effectiveness. In an example implementation, the example shown in FIG. 2 may be a screenshot of a user interface that shows the athlete and opponent and their respective volumes of effectiveness in real-time. These images/simulations shown in FIG. 2 are presented, and can be further manipulated, while displayed in a user interface.

Figure 3:
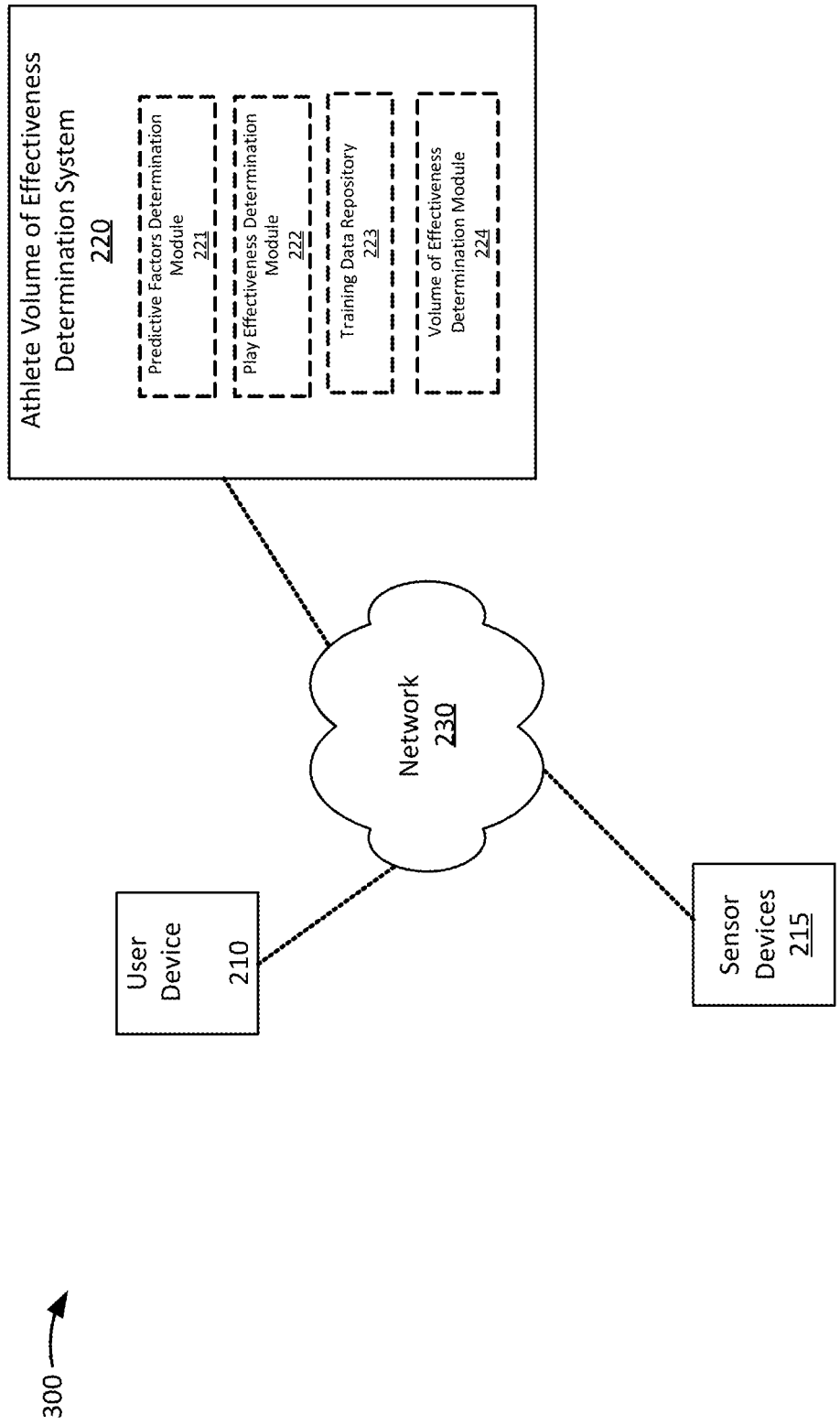
FIG. 3 shows an example environment in accordance with aspects of the present invention.

FIG. 3 shows an example environment in accordance with aspects of the present invention. As shown in FIG. 3, environment 300 includes a user device 210, sensor devices 215, athlete volume of effectiveness determination system 220, and a network 230. In embodiments, one or more components in environment 300 corresponds to one or more components in the cloud computing environment of FIG. 2. In embodiments, one or more components in environment 300 includes the components of computer system/server 12 of FIG. 1.

The user device 210 includes a computing device capable of communicating via a network, such as the network 230. For example, the user device 210 may correspond to a mobile communication device (e.g., a smart phone or a personal digital assistant (PDA)), a portable computer device (e.g., a laptop or a tablet computer), a desktop computer, and/or another type of computing device. In some embodiments, the user device 210 hosts an application that are used to display a representation of athletes and their respective volumes of effectiveness. Additionally, or alternatively, the user device 210 are used to view a live or recorded broadcast of a sporting event in which the volume of effectiveness is superimposed on live video of athletes.

Additionally, or alternatively, the user device 210 receives information that identifies the predictive factors from which a volume of effectiveness is based at a particular point in time (e.g., to allow athletes and/or coaches to evaluate how different predictive factors and situations affect the volume of effectiveness).

The sensor devices 215 includes one or more electronic sensors (e.g., cameras, motion sensors, object sensors, audio sensors, etc.) that are used to gather sensor data related to predictive factors. In embodiments, the sensor devices 215 are distributed on or around a court, field, or the like. In embodiments, the sensor devices 215 are used to determine predictive factors and/or other data during gameplay, such as athlete trajectory, ball trajectory, athlete speed, athlete acceleration, changes in athlete movement, orientation/position, etc. In embodiments, the sensor devices 215 include wearable devices worn by an athlete in which the sensor devices 215 gather biometrics data and/or one or more predictive factors such as those described herein. In embodiments, the sensor devices 215 gather data, such as X, Y, Z coordinates of the position and/or velocity unit vector of the ball and each athlete/opponent, speed of the ball and each athlete/opponent, etc. In embodiments, the sensor devices 215 gather data at any suitable rate, such as 50 times per second. Data gathered by the sensor devices 215 may be stored in a cloud-based database and may include millions or potentially billions of data points. In embodiments, data records are stored to associate predictive factors with a measure of effectiveness of a play.

The athlete volume of effectiveness determination system 220 includes one or more computing devices (e.g., such as computer system/server 12 of FIG. 1) that dynamically determines a volume of effectiveness for an athlete during gameplay. As described herein, the athlete volume of effectiveness determination system 220 tracks training data that establishes a measure of effectiveness of various plays made by an athlete (e.g., using a play effectiveness determination module 222), and the predictive factors associated with effectiveness (e.g., using a predictive factors determination module 221). From the training data (e.g., stored by a training data repository 223), the athlete volume of effectiveness determination system 220 determines weighting factors that are incorporated into a determination of unknown variables in volume equation, as described in greater detail herein. The athlete volume of effectiveness determination system 220 monitors sensor data gathered by the sensor devices 215, and store information associating the sensor data (e.g., relating to predictive factors) with the measure of effectiveness of a play. The athlete volume of effectiveness determination system 220 uses real-time sensor data to determine real-time predictive factors (e.g., using the predictive factors determination module 221) and determine real-time volume of effectiveness for an athlete (e.g., using the volume of effectiveness determination module 224). The athlete volume of effectiveness determination system 220 uses machine learning/training and cognitive computing techniques to accurately determine a target's volume of effectiveness at any given time based on the predictive factors associated with the target.

The network 230 includes network nodes and one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 300 is not limited to what is shown in FIG. 3. In practice, the environment 300 may include additional devices and/or networks; fewer devices and/or networks; different devices and/or networks; or differently arranged devices and/or networks than illustrated in FIG. 3. Also, in some implementations, one or more of the devices of the environment 300 may perform one or more functions described as being performed by another one or more of the devices of the environment 300. Devices of the environment 300 may interconnect via wired connections, wireless connections, or a combination of wired and wireless connections.

Figure 4:
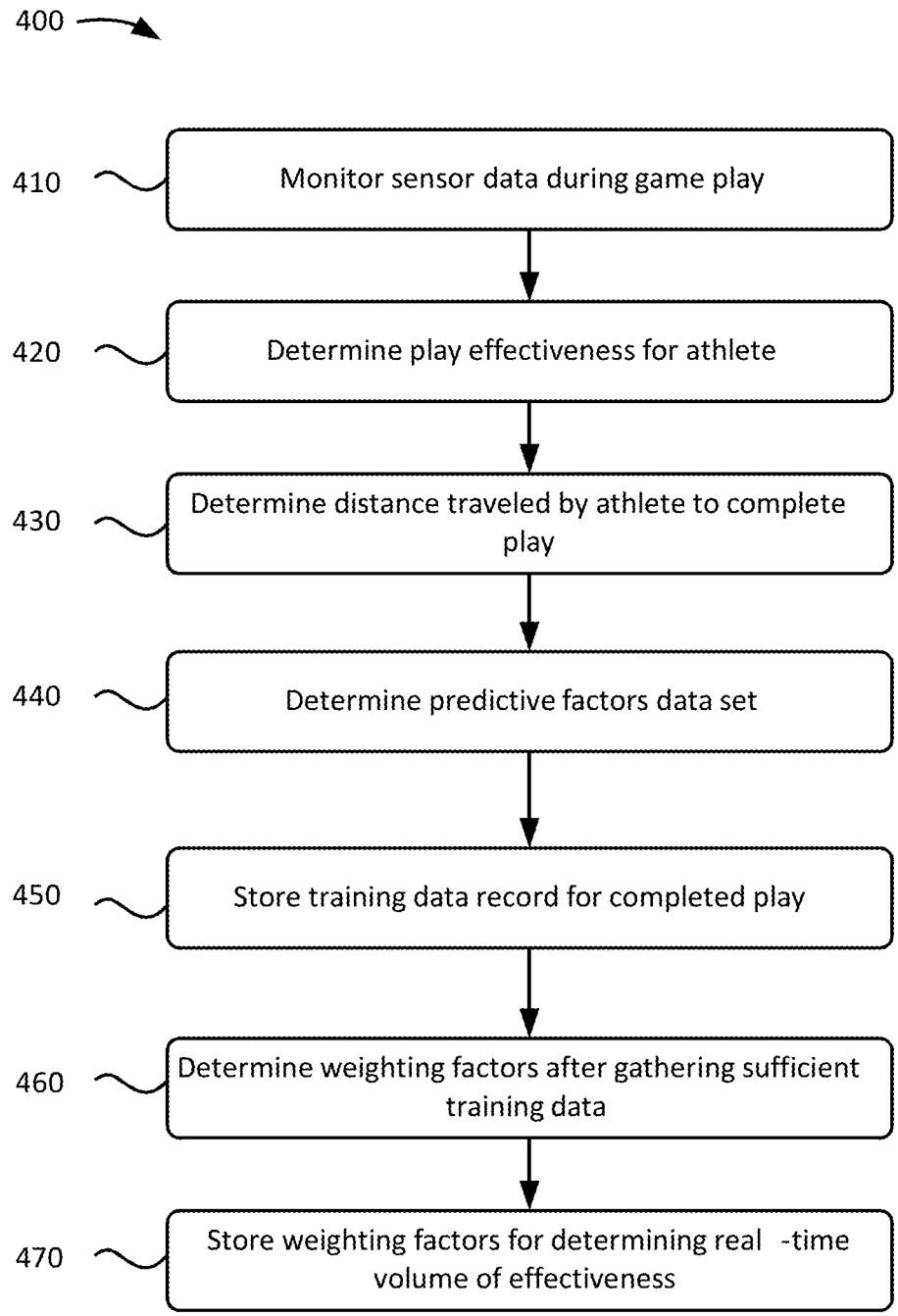
FIG. 4 shows an example flowchart for generating training data records to be used to determine weighting factors and values for unknown variables in a volume of effectiveness equation in accordance with aspects of the present invention.

FIG. 4 shows an example flowchart of a process for generating training data records to be used to determine weighting factors and used to determine values for unknown variables in a volume of effectiveness equation. In embodiments, the steps of FIG. 4 are implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention. As described herein, the process of FIG. 4 are used to determine training data representing the effectiveness of plays, the volume of effectiveness for those plays, and the predictive factors for those plays. Once sufficient training data has been generated, a real-time volume of effectiveness at a given time is derived using the training data based on a real-time set of predictive factors.

As shown in FIG. 4, as an illustrative example, process 400 includes monitoring sensor data during gameplay (step 410). For example, the athlete volume of effectiveness determination system 220 monitors sensor data from the sensor devices 215 during gameplay of a sport (e.g., tennis). In embodiments, the athlete volume of effectiveness determination system 220 monitors sensor data relating to predictive factors, such as athlete trajectory, ball trajectory, athlete speed, athlete acceleration, changes in athlete movement, orientation/position, etc.

Process 400 also includes determining play effectiveness (step 420). For example, the athlete volume of effectiveness determination system 220 determine a measure of the effectiveness of a play made by an athlete. Using the game of tennis as an illustrative example, a "play" may be considered to be an event in which the athlete is tasked with returning the ball to the opponent in an attempt to score a point against the opponent. In tennis, the effectives of the play may be measured based on the ball speed after the play is made (e.g., when the ball is returned). the outcome of the play (e.g., whether the play resulted in scoring a point, defending against the opponent from scoring the point, etc.), and/or the outcome of subsequent plays. In embodiments, the effectiveness of the play is determined as a numerical value that represents the level to which a play is effective. For example, a play that scored a point immediately would be scored relatively high, whereas a play that lost the point immediately would be scored relatively low.

Process 400 further includes determining distance traveled by the athlete to complete the play (step 430). For example, the athlete volume of effectiveness determination system 220 uses the monitored sensor data to determine a distance traveled by the athlete to complete the play. As described in greater detail herein, in one example implementation, this distance represents a radius value for a volume of effectiveness and is part of a training data record that is used to determine weighting factors to be used to determine real-time volume of effectiveness. In effect, the distance traveled by the athlete to complete the play represents a radius and hence, a volume (in which the height value, in one example implementation, is a fixed value based on the athlete's height and reach). If the play is considered to be effective (e.g., at step 420), then the volume determined at step 430 is a volume of effectiveness.

Process 400 also includes determining a predictive factors data set (step 440). For example, the athlete volume of effectiveness determination system 220 determine a predictive factors data set identifying the predictive factors during the play at a given point in time. The predictive factors data set includes information gathered by the sensor devices 215 while monitoring the sensor data. For example, the predictive factors data set represents the athlete's position on the court, athlete trajectory, athlete momentum, ball trajectory, athlete speed, athlete acceleration, changes in athlete movement, orientation/position, and/or other gameplay-related actions. Additionally, or alternatively, the predictive factors data set identifies biometrics data for the athlete.

Process 400 furthers include storing a training data record for the completed play (step 450). For example, the athlete volume of effectiveness determination system 220 stores a training data record that associates the predictive data set with a measure of the play effectiveness, and the distance traveled by the athlete (e.g., corresponding to a radius in a volume equation for a cylinder, or a length/width in a volume equation for a rectangular prism). That is, a training data record identifies a level of effectiveness for the play, the distance traveled to make a play, and the predictive data associated with the play. As such, the training data record identifies a volume of effectiveness for a play given a set of predictive data. Process steps 410-450 are repeated to collect more training data and generate more training data records for different sets of predictive data, and to average effectiveness scores for similar sets of predictive factors. In an example implementation, the predictive factors are normalized into a value set using any suitable data normalization technique.

As described in greater detail herein, the training data records are used to determine a real-time volume of effectiveness based on comparing real-time predictive factors with historical predictive factors and historical volumes of effectiveness associated with those historical predictive factors. As described herein, weighting factors are also be considered when determining real-time volume of effectiveness.

Process 400 also includes determining weighting factors after gathering sufficient training data (step 460). For example, the athlete volume of effectiveness determination system 220 determine weighting factors that are used for determining values of unknown variables in a volume of effectiveness equation. Using a cylinder as an example, the volume of effectiveness equation is $V=\pi r^2 h$. Two regression equations are used for the radius and height in the volume effectiveness equation of the cylinder.

$$r_i = A_1 x_{i1} + A_2 x_{i2} + \ldots + A_p x_{ip} + \varepsilon_r \quad (1)$$

$$h_i = \beta_1 x_{i1} + \beta_2 x_{i2} + \ldots + \beta_p x_{ip} + \varepsilon_h \quad (2)$$

In equations (1) and (2), $x_i$ is a set of predictive factors, A and $\beta$ are the weighting factor (e.g., weighting coefficients), and $\varepsilon_r$ and $\varepsilon_h$ are configurable constants that adjusts the radius and height as desired (e.g., $\varepsilon$ can be adjusted higher or lower to show a larger or smaller radius and heights for athlete training purposes). The weighting factor are a slope of a regression line, and based around the predictive factors. In equation 1, since r for each training data record is known (e.g., from step 430), and the predictive factors $x_i$ are known (e.g., from step 440), the athlete volume of effectiveness determination system 220 derives each value for $\beta$ in equation (1) by back-solving for $\beta$ using the known values for r and $x_i$ included in the trading data records. Further, using a predetermined value for h (e.g., based on an athlete's height), the predictive factors $x_i$ (e.g., from step 440), the athlete volume of effectiveness determination system 220 derives each value for $\beta$ in equation (2). As later described herein, the two regression equations are used to determine the radius and height values and in turn, determine the volume of effectiveness.

Process 400 further includes storing the weighting factors for determining the real-time volume of effectiveness (step 470). For example, the athlete volume of effectiveness determination system 220 stores the weighting factors determined at step 460. As described herein, the athlete volume of effectiveness determination system 220 later uses the weighting factors to determine a radius given a set of predictive factors.

Figure 5:
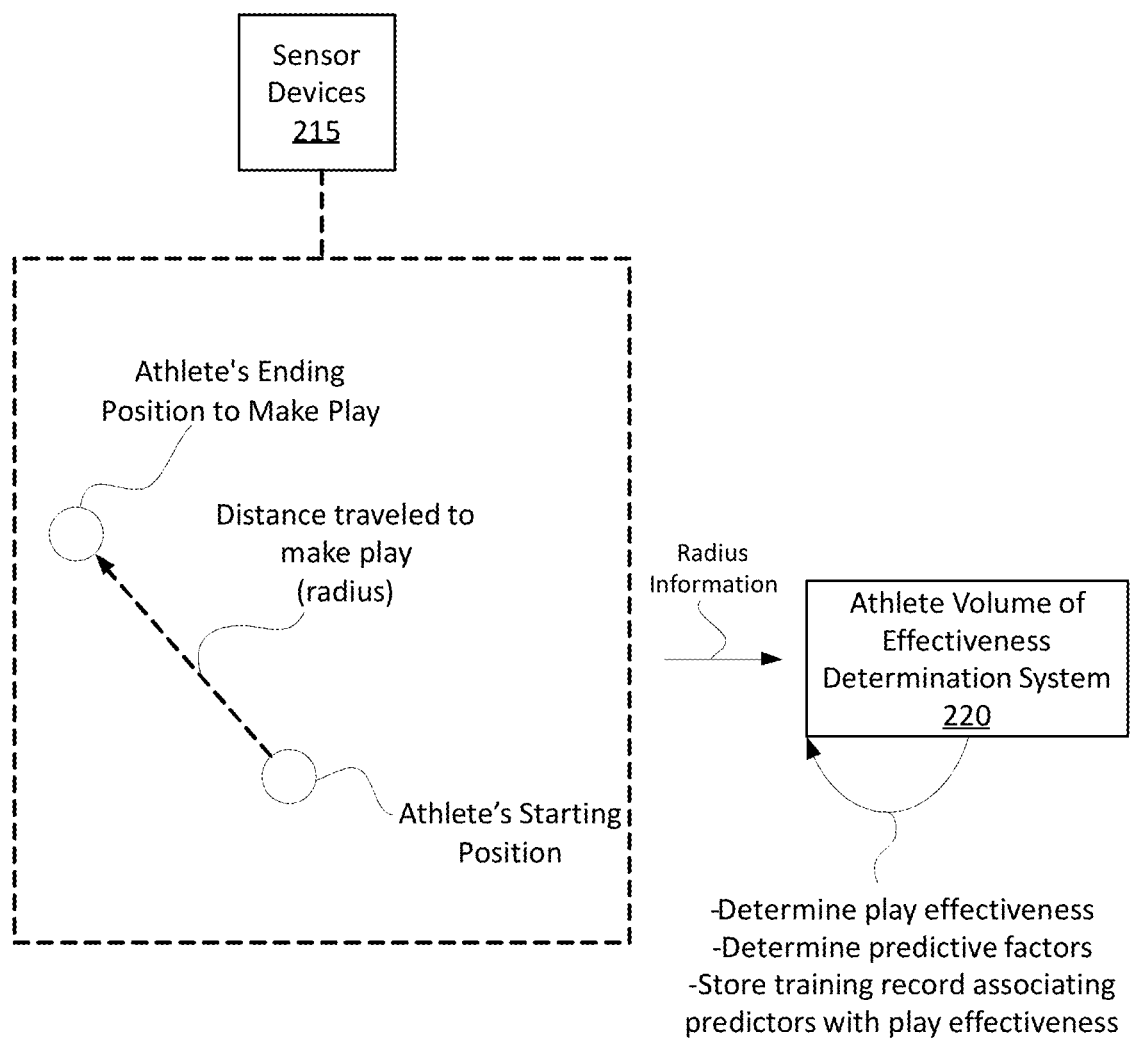
FIG. 5 shows an implementation in accordance with aspects of the present invention.

FIG. 5 shows an example implementation in accordance with aspects of the present invention. As shown in FIG. 5, sensor devices 215 are used to determine an athlete's starting position at the beginning of a play, the athlete's ending position to make the play, and the distance traveled to make the play (e.g., the radius in a volume equation). The athlete volume of effectiveness determination system 220 determine the radius information from the sensor devices 215 (e.g., similar to process step 430), determine the effectiveness of the play (e.g., similar to process step 420), determine the predictive factors (e.g., similar to process step 440), and store the training data record (e.g., similar to process step 450).

Figure 6:
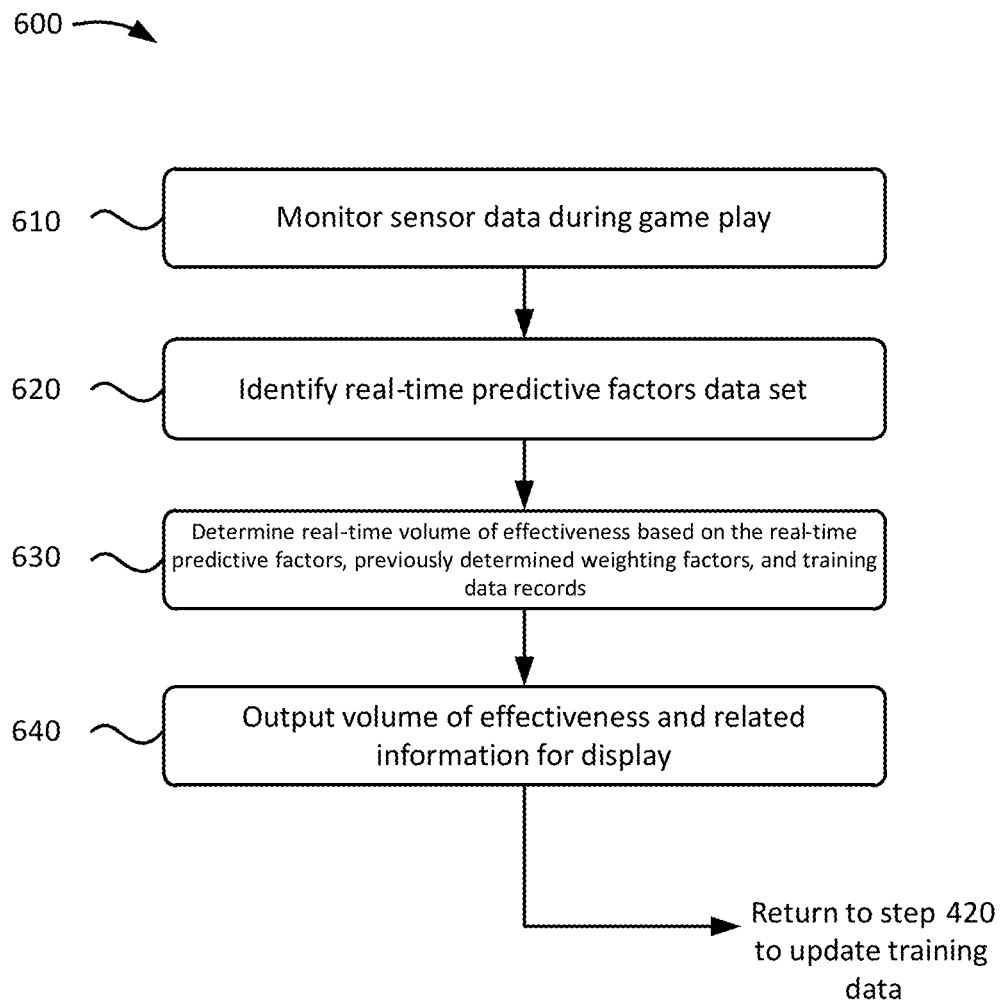
FIG. 6 shows an example flowchart for determining a real-time volume of effectiveness at a particular point in time based on training data, real-time predictive factors, and/or weighting factors in accordance with aspects of the present invention

FIG. 6 shows an example flowchart of a process for determining a real-time volume of effectiveness at a particular point in time based on training data, real-time predictive factors, and/or weighting factors. In an example implementation, the steps of FIG. 6 are implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention. As described herein, data and/or training records from process 400 are used in process 600 as noted in the individual process steps of process 600.

As shown in FIG. 6, process 600 includes monitoring sensor data during game play (step 610). For example, the athlete volume of effectiveness determination system 220 monitors sensor data from the sensor devices 215 in a similar manner as discussed above with respect to process step 410.

Process 600 also includes identifying a real-time predictive factors data set (step 620). For example, the athlete volume of effectiveness determination system 220 identifies the predictive factors data set from the monitored sensor data from step 610 in real-time. As described herein, the predictive factors includes a target's (e.g., athlete's) position on the court, athlete trajectory, athlete momentum, ball trajectory, athlete speed, athlete acceleration, changes in athlete movement, orientation/position, and/or other gameplay-related actions.

Process 600 further includes determining a real-time volume of effectiveness based on the real-time predictive factors, previously determined weighting factors, and the training data records (step 630). In one example, the athlete volume of effectiveness determination system 220 is a real-time volume of effectiveness for a target (e.g., athlete) by determining the unknown variables in a volume equation. Using a cylinder as an example, the athlete volume of effectiveness determination system 220 uses the two regression equations (1) and (2) to determine the radius and height, and in turn, the volume of effectiveness for the target (e.g., athlete). As an example, the athlete volume of effectiveness determination system 220 determine the radius and height in the volume equation of a cylinder using equations (1) and (2) in which $x_i$ are each sets of predictive factors determined at step 620 and β is the weighting factor previously determined (e.g., at step 460 in process 400 of FIG. 4), and using the training data records (e.g., generated and stored at step 450 in process 400 of FIG. 4 and as generated and stored in FIG. 5). In embodiments, the athlete volume of effectiveness determination system 220 determine the real-time volume of effectiveness using any number of shapes (e.g., rectangular prisms, trapezoidal prisms, pentagonal prisms, octagonal prisms, etc.). In an example implementation, the real-time volume of effectiveness is the union or intersection of the volumes of multiple shapes. In embodiments, the training data records are used to determine the real-time volume of effectiveness based on comparing real-time predictive factors with historical predictive factors and historical volumes of effectiveness associated with those historical predictive factors, combined with the previously determined weighting factors.

Process 600 includes outputting the volume of effectiveness and related information for display (step 640). For example, the athlete volume of effectiveness determination system 220 outputs the volume of effectiveness for display. As described herein, in an example implementation, the volume of effectiveness is displayed as part of a live broadcast in which the volume of effectiveness is superimposed over the athlete (e.g., in a similar manner shown in FIG. 2). Additionally, or alternatively in an example implementation, a user device 210 runs an application that graphically represents the athletes as well as the volume of effectiveness in real time.

In embodiments, the athlete volume of effectiveness determination system 220 also outputs related information associated with the volume of effectiveness. For example, natural language generation techniques are implemented to generate narratives that describe situations that are based on a volume of effectiveness and corresponding predictive factors. As an illustrative example, one example aspect of the present invention generates the narrative "Player A has been exceptional at returning balls after 5 rounds of rallying and when hit to his forehand."

As further shown in FIG. 6, process 600 returns to process step 420 in order to generate more training data records based on continued game play. In this way, the training data is continuously updated and refined to improve on the calculation and accuracy of the volume of effectiveness. In an example implementation, process 600 is repeated continuously so that real-time volume of effectiveness is dynamically determined and displayed during the progression of gameplay, as athletes move around the court and make plays. In this way, spectator experience is improved by providing spectators with greater insight as to how gameplay affects the athletes' effectiveness. Further, in an example implementation, gameplay video with the volume of effectiveness is stored and replayed at a later time to allow athletes and coaches to evaluate, adjust, and improve technique.

Figure 7:
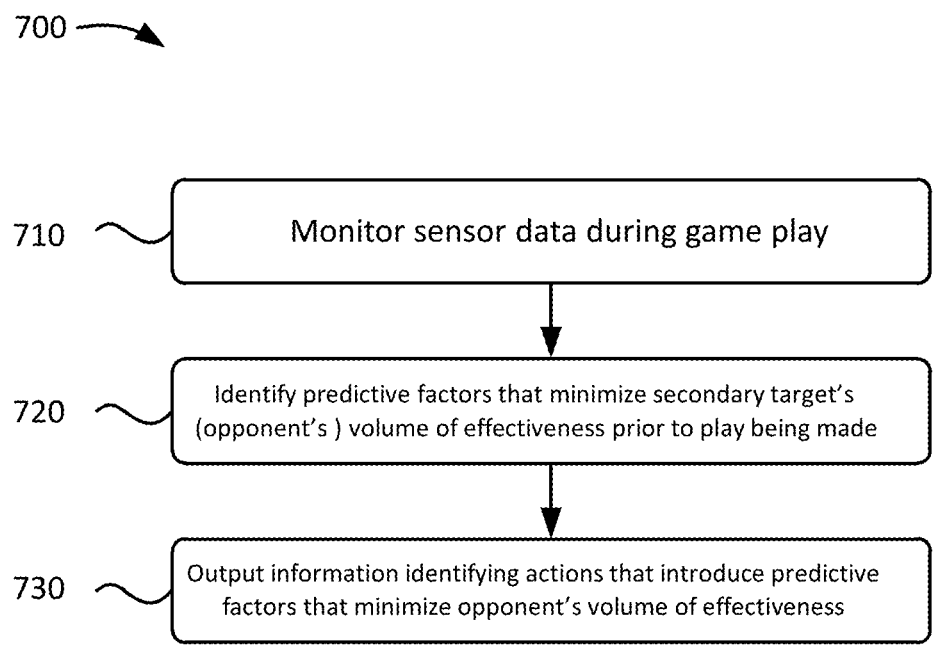
FIG. 7 shows an example flowchart for determining actions that minimize an opponent's volume of effectiveness in accordance with aspects of the present invention.

FIG. 7 shows an example flowchart of a process for determining actions that minimize an opponent's volume of effectiveness. In an example implementation, the steps of FIG. 7 are implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention.

As shown in FIG. 7, process 700 includes monitoring sensor data during game play (step 710). For example, the athlete volume of effectiveness determination system 220 monitors sensor data from the sensor devices 215 in a similar manner as discussed above with respect to process step 410.

Process 700 includes identifying predictive factors that minimize a secondary target's (e.g., opponent's) volume of effectiveness prior to play being made by a primary target or athlete (step 720). For example, based on previously obtained training data associated with the opponent, the athlete volume of effectiveness determination system 220 identifies a set of predictive factors that previously resulted in the smallest volume of effectiveness of the opponent. More specifically, the athlete volume of effectiveness determination system 220 identifies predictive factors for the opponent, such as the opponent's trajectory, momentum, position, orientation, etc., that minimize the opponent's volume of effectiveness.

Process 700 further includes output information identifying actions that introduce predictive factors that minimize the opponent's volume of effectiveness (step 730). For example, the athlete volume of effectiveness determination system 220 outputs information that identifies possible actions that a primary target (e.g., an athlete) may take to minimize their opponent's volume of effectiveness. That is, the athlete volume of effectiveness determination system 220 identifies a set of possible actions that the athlete may take and identify which action(s) the athlete should take in order to introduce situation in which the opponent's volume of effectiveness is reduced based on the opponent's predictive factors and effectiveness associated with those predictive factors.

As an example, the athlete volume of effectiveness determination system 220 provides suggested actions/shot selections an athlete may take such the predictive factors (determined at step 720) are introduced at a particular moment during gameplay, thus minimizing the opponent's volume of effectiveness. As an illustrative example, the athlete volume of effectiveness determination system 220 determine that at a given point in a tennis match, an athlete should aim to shoot the ball to a particular position in the court, towards the opponent's backhand swing, etc., as these actions would result in the occurrence of predictive factors that minimize the opponent's volume of effectiveness. That is, suggested actions would result the opponent being in a "weak" position, the opponent needing to take a difficult trajectory to make the play, the opponent needing to use a weaker type of swing (e.g., backhand swing), the opponent needing to travel a relatively long distance to make a play, the opponent needing to have a particular momentum and direction to make a play, etc.

In an example embodiment, the athlete volume of effectiveness determination system 220 stores and/or present the suggested actions in a way that allows the athlete and/or coaches to review the suggestions at a later time during playback of the gameplay. That is, in an example embodiment, the athlete volume of effectiveness determination system 220 incorporates the suggestions as a captioning as part of a live broadcast of gameplay that can be recorded for review at a later time. Additionally, or alternatively, the athlete volume of effectiveness determination system 220 stores the suggested actions in a data structure or some other manner for later review and retrieval. Additionally, or alternatively, the athlete volume of effectiveness determination system 220 graphically presents the suggested actions in an application such that the suggested actions are viewable at a corresponding time index during gameplay.

Figure 8:
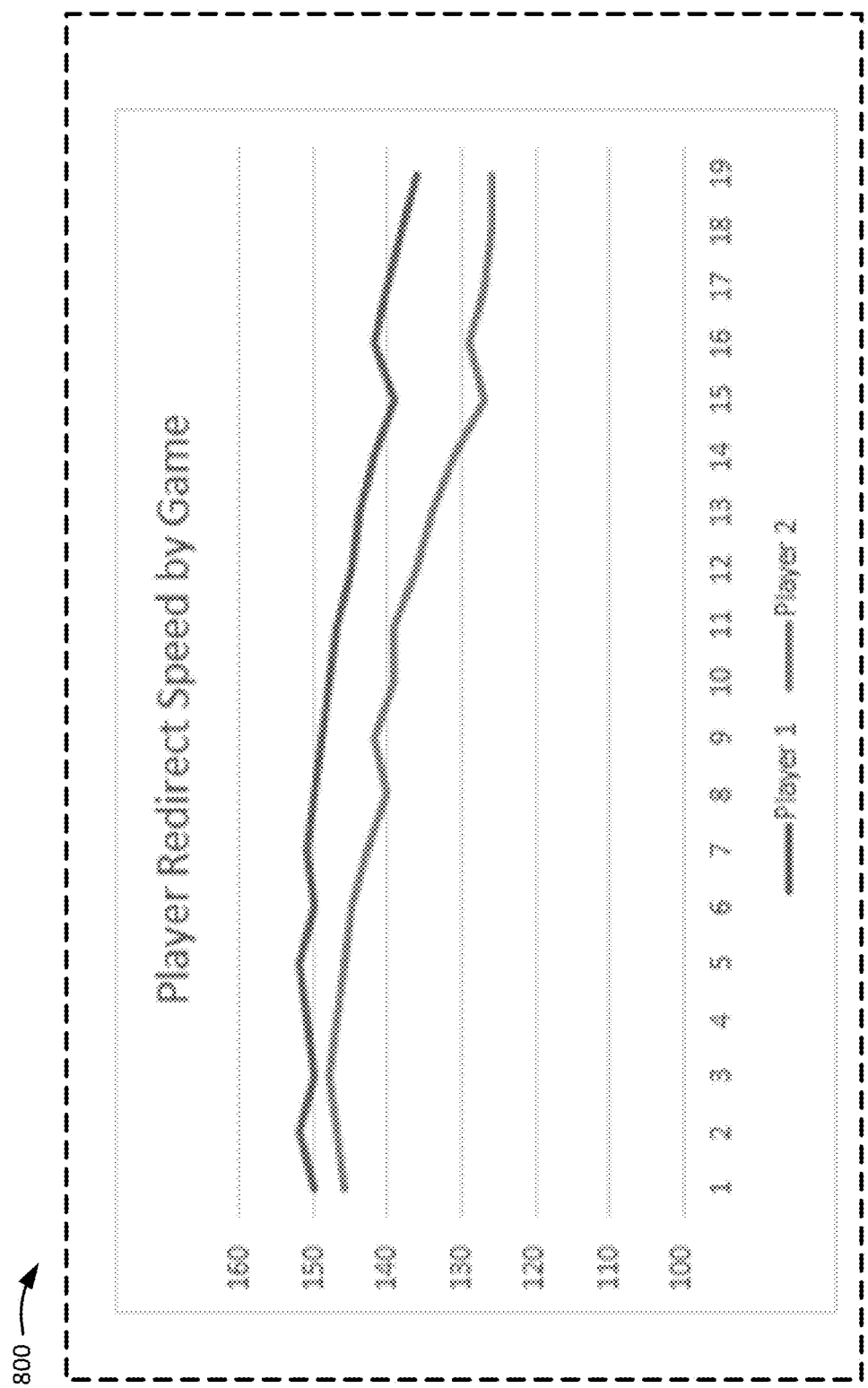
FIGS. 8-10 show example graphs illustrating a rate of change analysis of various predictive factors in accordance with aspects of the present invention.
Figure 9:
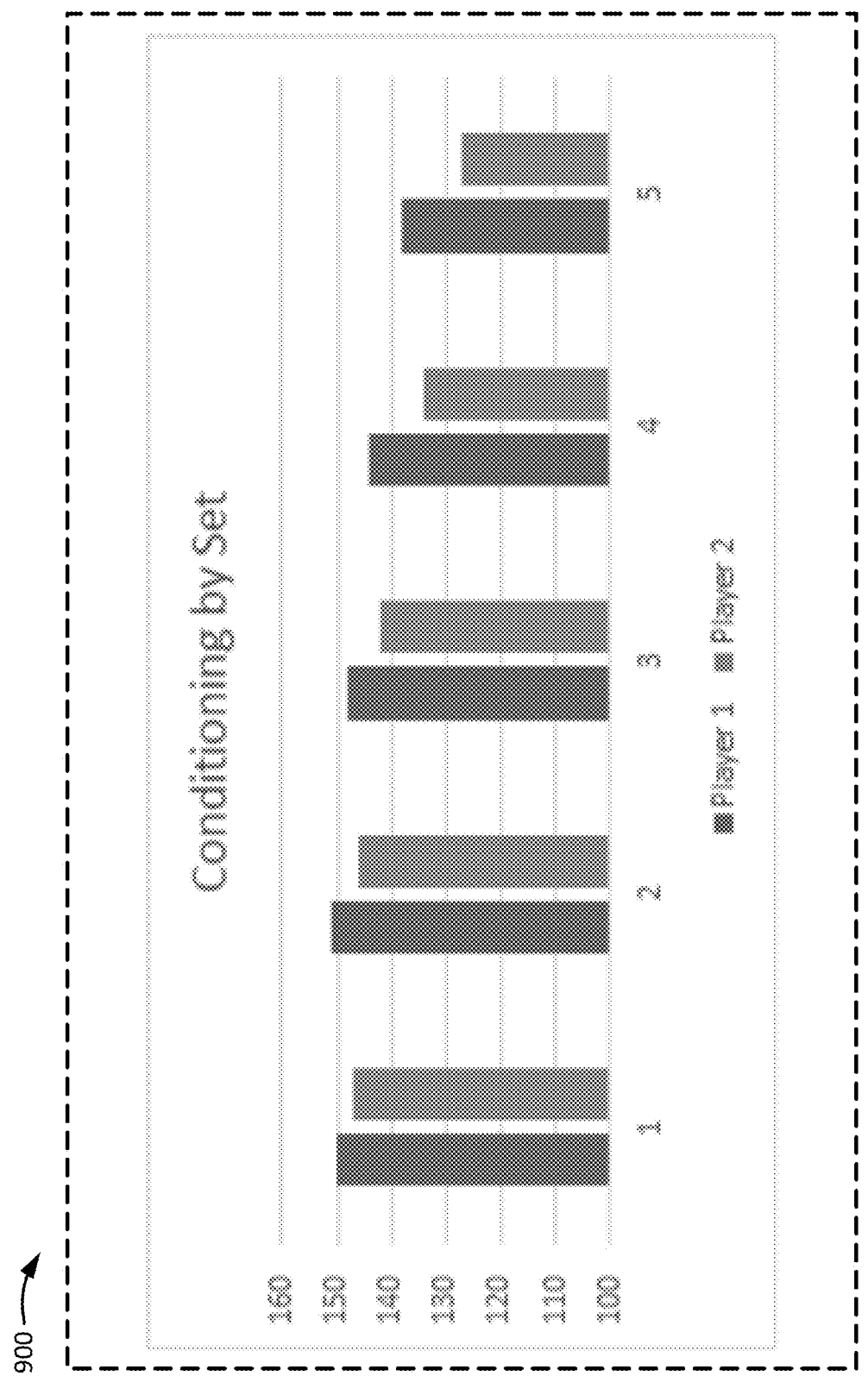
Figure 10:
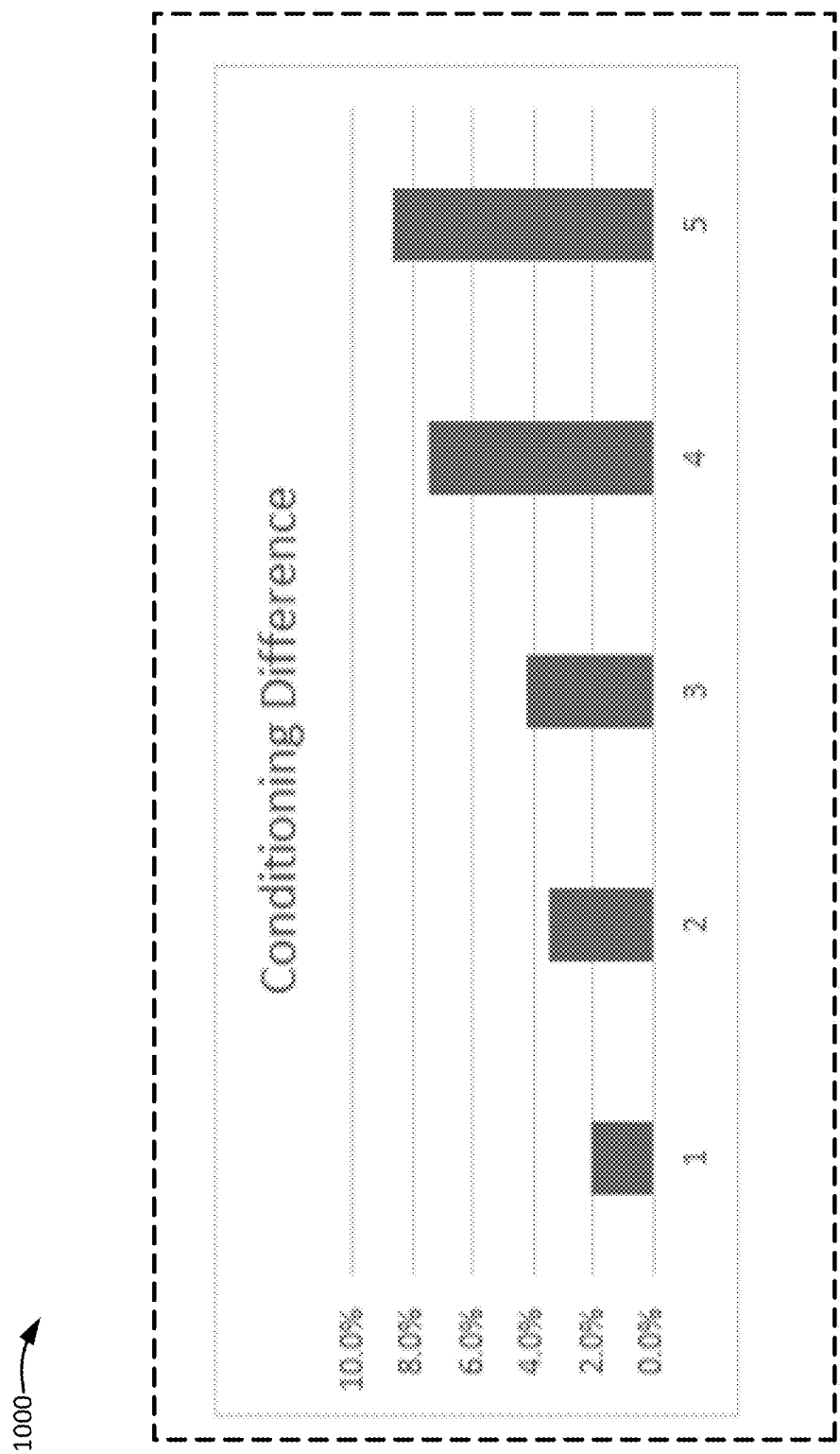

FIGS. 8-10 show example graphs illustrating a rate of change analysis of various predictive factors in accordance with aspects of the present invention. As described herein, in an example implementation, rates of change of predictive factors are forecasted and these forecasted rates of change are used as part of a regression model for determining the volume of effectives. Additionally, or alternatively, in an example implementation, the forecasted rates of change are used as input into a support vector machine to select a shape for determining volume of effectiveness. Data related to the forecasted rates of change may be displayed in a user interface, such as the user interface that displays the content of FIG. 2.

In an example embodiment, the athlete volume of effectiveness determination system 220 tracks data associated with the predictive factors and present the rate of change of this data in the form of a graph in a user interface (e.g., user interface 800). In the example shown in FIG. 8, the athlete volume of effectiveness determination system 220 presents the redirect speed of two athletes or players by game (e.g., in which the x-axis is the game number and the y-axis is a measure of redirect speed). From the graph shown in FIG. 8, the rate of change of the redirect speed is forecasted.

Referring to FIG. 9, in an example implementation, a comparison of the predictive factors data of two different athletes of players is displayed (e.g., in user interface 900). The comparison shows a rate of change of two different players by game. In an example implementation, the comparison or discrepancy between the players factors in to the volume of effectiveness for each player (e.g., a higher discrepancy with an opponent results in a lower volume of effectiveness for the opponent).

Referring to FIG. 10, in an example implementation, the difference for a particular athlete for a predictive factor over several games is presented (e.g., in a user interface 1000). From the graph shown in FIG. 10, the athlete's rate of change for the predictive factor can be forecasted and used to determine volume of effectiveness as described herein.

Figure 11:
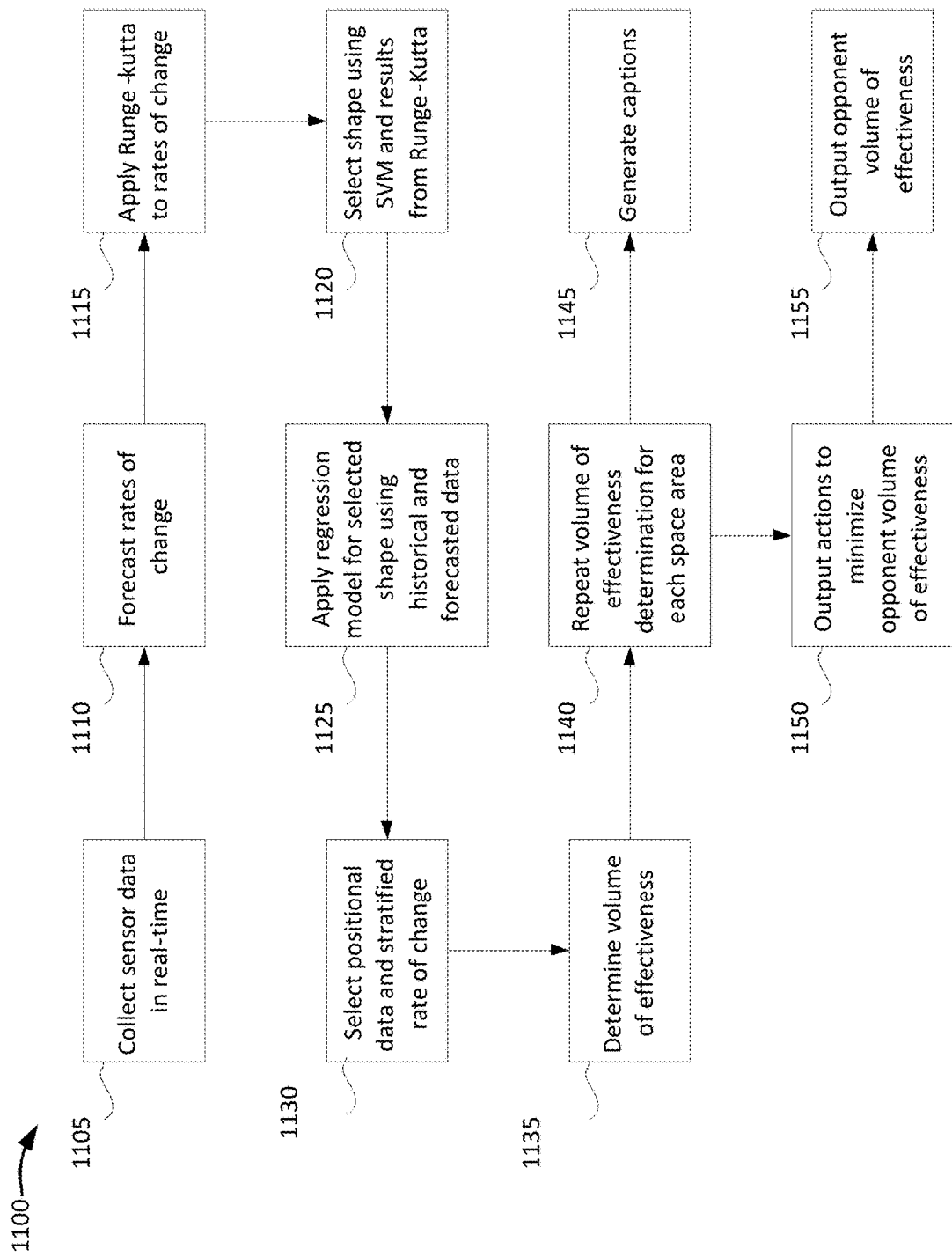
FIG. 11 shows an example flowchart for determining a real-time volume of effectiveness in accordance with aspects of the present invention.

FIG. 11 shows an example flowchart for determining a real-time volume of effectiveness. In an example implementation, the steps of FIG. 11 are implemented in the environment of FIG. 3, for example, and are described using reference numbers of elements depicted in FIG. 3. As noted above, the flowchart illustrates the architecture, functionality, and operation of possible implementations of systems, methods, and computer program products according to various embodiments of the present invention.

As shown in FIG. 11, process 1100 includes collecting sensor data in real-time (step 1105). For example, the athlete volume of effectiveness determination system 220 collects sensor data from the sensor devices 215 (e.g., in a similar manner as discussed above with respect to step 410 in FIG. 4)

Process 1100 also includes forecasting a rate of change (step 1110). For example, the athlete volume of effectiveness determination system 220 forecasts the rate of change of predictive factors based on the sensor data collected over a period of time (e.g., collected at step 1105). Examples of forecasting the rate of change of predictive factors is discussed above with respect to FIGS. 8-10.

Process 1100 further includes applying Runge-Kutta to the rates of changes (step 1115). For example, the athlete volume of effectiveness determination system 220 applies Runge-Kutta to the rates of changes determined at step 1110. In embodiments, the classical RK4 Runge-Kutta method may be applied, for example:

$$y_{n+1} = y_n + \frac{1}{6}(k_1 + 2k_2 + 2k_3 + k_4), \tag{3}$$

$$t_{n+1} = t_n + h \tag{4}$$

for n=0, 1, 2, 3, . . . , using $$k_1 = hf(t_n, y_n), \tag{5}$$

$$k_2 = hf\left(t_n + \frac{h}{2}, y_n + \frac{k_1}{2}\right), \tag{6}$$

$$k_3 = hf\left(t_n + \frac{h}{2}, y_n + \frac{k_2}{2}\right), \tag{7}$$

$$k_4 = hf(t_n + h, y_n + k_3). \tag{8}$$

In the above Runge-Kutta method, $y_{n+1}$ is the RK4 approximation of $y(t_{n+1})$ at time t, and the next value $(y_{n+1})$ is determined by the present value $(y_n)$ plus the weighted average of four increments, where each increment is the product of the size of the interval, h, and an estimated slope specified by function $f$ on the right-hand side of the differential equation. $k_1$ is the increment based on the slope at the beginning of the interval, using y (Euler's method); $k_2$ is the increment based on the slope at the midpoint of the interval, using y and $k_1$; $k_3$ is again the increment based on the slope at the midpoint, but now using y and $k_2$; $k_4$ is the increment based on the slope at the end of the interval, using y and $k_3$.

Process 1100 also includes selecting a shape using a support vector machine and results of the Runge-Kutta (step 1120). For example, the athlete volume of effectiveness determination system 220 selects a shape (e.g., cylinder, rectangular prism, etc.) by inputting the results of the Runge-Kutta analysis (from step 1115) into a support vector machine (SVM). In an example embodiment, the athlete volume of effectiveness determination system 220 uses any suitable SVM technique to analyze data used for classification and regression analysis as part of the selection of the shape.

Process 1100 further includes applying regression model for selected shape using historical and forecasted data (step 1125). For example, the athlete volume of effectiveness determination system 220 applies a regression model for the selected shape and using the historical and forecasted data (e.g., from steps 1105 and step 1110). Using a cylinder as an example, the athlete volume of effectiveness determination system 220 may apply the regression model, such as those associated with equations (1) and (2).

Process 1100 also includes selecting positional data and stratified rate of change (step 1130). For example, the athlete volume of effectiveness determination system 220 selects positional data (e.g., based on an athlete's current position on a court or field) and stratified rate of change (e.g., based on the rate of change data from step 1110). From step 1130, the athlete volume of effectiveness determination system 220 determines the unknown variables in volume regression equations (e.g., equations (1) and (2) using a cylinder as an example).

Process 1100 further includes determining the volume of effectiveness (step 1135). For example, the athlete volume of effectiveness determination system 220 determines the volume of effectiveness by inputting the unknown variables (derived from steps 1125 and step 1130) into the regression equations of the selected shapes.

Process 1100 also includes repeating the volume of effectiveness determination for reach space area (step 1140). For example, the athlete volume of effectiveness determination system 220 repeats steps 1130 and 1135 as the athlete moves around the court or field to determine the volume of effectiveness of the athlete at various points in time.

Process 1100 further includes generating captions (step 1145). For example, the athlete volume of effectiveness determination system 220 generates narratives or captions based on the athlete's volume of effectives (e.g., using natural language generation (NLG) techniques to generate narratives that describe situations that are based on the volume of effectiveness and corresponding predictive factors).

Process 1100 also includes outputting actions to minimize opponent volume of effectiveness (step 1150). For example, the athlete volume of effectiveness determination system 220 outputs actions to minimize opponent volume of effectiveness in a similar manner as discussed above with respect to process step 730 of FIG. 7.

Process 1100 further includes output opponent volume of effectiveness (step 1155). For example, the athlete volume of effectiveness determination system 220 determines and outputs the opponent's volume of effectiveness based on similar processes steps as those described in steps 1105-1135), but for an opponent of the athlete.

As described herein, aspects of the present invention dynamically determine a region of effectiveness of athletes during gameplay of an athletic sport (e.g., tennis), and display the region of effectiveness (e.g., volume of effectiveness) in real-time during game play. As described herein, the region of effectiveness represents an area or a volume surrounding an athlete in which the athlete is considered to be "effective" (e.g., make an effective "play" that has a high likelihood to score a point against an opponent or defend against a point being scored against the athlete by an opponent). The volume of effectiveness are used to predict where an athlete/opponent may be on the court at a given time and are used for real-time and/or post-game analysis to improve spectator experience and coaching tactics.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, by a computing device, real-time sensor data providing information regarding a participant in a sporting event during gameplay of the sporting event;
determining, by the computing device, real-time predictive factors associated with the participant based on the monitoring the real-time sensor data during the gameplay of the sporting event, the real-time predictive factors comprise a trajectory of a ball;
training a machine learning system using machine learning on data which identifies historical effectiveness of play of the participant;
determining weighting factors based on the training data which identifies the historical effectiveness of the play of the participant, wherein the weighting factors comprise a first factor for adjusting a radius for an athlete volume of effectiveness within the training data and a second factor for adjusting a height of the athlete volume of effectiveness within the training data;
determining, by the computing device, a size of a real-time region of effectiveness surrounding the participant during the gameplay of the sporting event based on the predictive factors, the training data identifying historical effectiveness of the play of the participant, and the weighting factors, wherein the real-time region of effectiveness represents a region in which the participant is considered to be effective;
the real-time region of effectiveness surrounding the participant changes based on changes to the real-time predictive factors during the gameplay of the sporting event;
identifying, by the computing device, a set of suggested actions for the participant prior to a play being made by the participant in the sporting event, wherein the set of suggested actions are predicted to minimize a real-time region of effectiveness of a second participant prior to a play being made by the second participant in the sporting event, wherein the second participant is an opponent of the participant;

forecasting, by the computing device, a rate of change of the real-time predictive factors;

determining, by the computing device, a volume of the real-time region of effectiveness for the participant based on the forecasted rate of change of the real-time predictive factors; and selecting, by the computing device, a shape for the determined volume of the real-time region of effectiveness by utilizing a support vector machine which receives the forecasted rate of change of the real-time predictive factors.

2. The computer-implemented method of claim 1, further comprising:

updating the real-time region of effectiveness for the participant based on continued monitoring of the sensor data, outputting a visual display which comprises continuously outputting updates to the real-time region of effectiveness for continuously displaying the updates to the real-time region of effectiveness; and generating an audio narrative that describes at least one situation that is based on the real-time region of effectiveness and the real-time predictive factors corresponding to the real-time region of effectiveness.

3. The computer-implemented method of claim 1, further comprising determining real-time predictive factors for the second participant that minimizes the real-time region of effectiveness of the second participant, wherein the training data includes a training record identifying an effectiveness of a play and a particular set of predictive factors associated with the effectiveness of the play.

4. The computer-implemented method of claim 3, wherein the real-time predictive factors for the second participant comprise a trajectory of the second participant, a momentum of the second participant, and an orientation of the second participant, and the predictive factors include at least one selected from the group consisting of:

position or orientation of a body of the participant;
position of the participant on a court;
the participant's momentum;
the participant's speed;
the participant's trajectory;
the participant's acceleration;
a trajectory of a ball; and
the participant's biometrics data.

5. The computer-implemented method of claim 1, wherein the real-time region of effectiveness is a volume of effectiveness in the form of the shape selected from the group consisting of: a cube, a cylinder, and a rectangular prism.

6. The computer-implemented method of claim 1, wherein the participant is an athlete of the sporting event and the sporting event is tennis.

7. The computer-implemented method of claim 1, wherein the real-time region of effectiveness is in the form of a cylinder having a volume, wherein a radius of the cylinder is determined based on a first regression equation and a height of the cylinder is based on a second regression equation.

8. The computer-implemented method of claim 7, wherein the first regression equation is $r\_i = A\_1\ x\_i1 + A\_2\ x\_i2 + \ldots + A\_p\ x\_ip + \varepsilon\_r$ and the second regression equation is $h\_i = \beta\_1\ x\_i1 + \beta\_2 x\_i2 + \ldots + \beta\_p\ x\_ip + \varepsilon\_h$ where xi is a set of predictive factors, A and β are weighting factors, and εr and εh are configurable constants.

9. The computer-implemented method of claim 1, wherein the participant is a primary participant, the method further comprising determining an action for the primary participant to minimize a region of effectiveness for a secondary participant based on predictive factors associated with the secondary participant.

10. The computer-implemented method of claim 1, wherein a service provider at least one of creates, maintains, deploys and supports the computing device.

11. The computer-implemented method of claim 1, wherein the monitoring, the determining the predictive factors, and the determining the real-time region of effectiveness are provided by a service provider on a subscription, advertising, and/or fee basis.

12. The computer-implemented method of claim 1, wherein the computing device includes software provided as a service in a cloud environment.

13. The computer-implemented method of claim 1, further comprising deploying a system comprising providing a computer infrastructure operable to perform the monitoring, the determining the predictive factors, and the determining the real-time region of effectiveness.

14. A computer program product for training a machine learning system to determine and display a real-time volume of effectiveness surrounding an athlete, the computer program product comprising a computer readable storage medium having program instructions embodied therewith, the program instructions executable by a computing device to cause the computing device to:

monitor sensor data during gameplay of a sporting event;

determine an effectiveness of a play made by the athlete during the gameplay of the sporting event;

determine a dataset of predictive factors associated with the athlete based on the monitoring the sensor data during the gameplay of the sporting event;

train the machine learning system using the sensor data, the determined effectiveness of the play, and the dataset of predictive factors to generate and store a training data record that associates the effectiveness of the play with the dataset of predictive factors;

determine a dataset of real-time predictive factors based on the monitoring the sensor data during the gameplay of the sporting event, the real-time predictive factors comprise a trajectory of a ball;

train the machine learning system using machine learning on data which identifies historical effectiveness of the play of a participant, wherein the weighting factors comprise a first factor for adjusting a radius for an athlete volume of effectiveness within the training data and a second factor for adjusting a height of the athlete volume of effectiveness within the training data;

determine weighting factors based on the training data which identifies the historical effectiveness of the play of the participant;

determine the real-time volume of effectiveness surrounding the athlete during the gameplay of the sporting event based on the dataset of real-time predictive factors, the training data identifying historical effectiveness of the play of the participant, and the weighting factors;

generate and output a visual display of the real-time volume of effectiveness superimposed over and around a video image of the athlete during the gameplay of the sporting event, wherein the real-time volume of effectiveness dynamically changes during the gameplay of the sporting event;

forecast a rate of change of the real-time predictive factors;
determine a volume of the real-time volume of effectiveness for the participant based on the forecasted rate of change of the real-time predictive factors; and
select a shape for the determined volume of the real-time volume of effectiveness by utilizing a support vector machine which receives the forecasted rate of change of the real-time predictive factors.

15. The computer program product of claim 14, further comprising:
generating an audio narrative that describes at least one situation that is based on the real time region of effectiveness and the real-time predictive factors corresponding to the real-time region of effectiveness,
wherein the real-time volume of effectiveness is in the form of a cylinder having a volume, wherein the determined radius of the cylinder is determined based on a first regression equation and a height of the cylinder is based on a second regression equation.

16. The computer program product of claim 15, further comprising:
determining real-time predictive factors for a second participant that minimizes a real-time region of effectiveness of the second participant,
wherein the first regression equation is $r\_i = A\_1\, x\_i1 + A\_2\, x\_i2 + \ldots + A\_p\, x\_ip + \varepsilon\_r$ and the second regression equation is $h\_i = \beta\_1\, x\_i1 + \beta\_2\, x\_i2 + \ldots + \beta\_p\, x\_ip + \varepsilon\_h$ where xi is a set of predictive factors, A and β are weighting factors, and εr and εh are configurable constants.

17. The computer program product of claim 16, wherein the real-time predictive factors for the second participant comprises a trajectory of the second participant, a momentum of the second participant, and an orientation of the second participant, and the weighting factor β is determined based on back-solving for the weighting factor β using a value for the radius included in the training data record.

18. The computer program product of claim 14, wherein the dataset of predictive factors include at least one selected from the group consisting of:
position or orientation of a body of the athlete;
position of the athlete on a court;
the athlete's momentum;
the athlete's speed;
the athlete's trajectory;
the athlete's acceleration;
a trajectory of a ball; and
the athlete's biometrics data.

19. A system comprising:
a processor, a computer readable memory and a computer readable storage medium associated with a computing device;
program instructions to monitor sensor data during gameplay of a sporting event;
program instructions to determine a volume of effectiveness for a primary participant in the sporting event based on the monitoring the sensor data and a first set of predictive factors associated with the primary participant, wherein the volume of effectiveness for the primary participant represents a volume surrounding the primary participant in which the primary participant is considered to be effective and the first set of predictive factors comprise a trajectory of a ball;
program instructions to train a machine learning system using machine learning on data which identifies historical effectiveness of play of the primary participant;
program instructions to determine weighting factors based on the training data which identifies the historical effectiveness of the play of the primary participant, wherein the weighting factors comprise a first factor for adjusting a radius for an athlete volume of effectiveness within the training data and a second factor for adjusting a height of the athlete volume of effectiveness within the training data;
program instructions to determine a volume of effectiveness for a secondary participant in the sporting event based on the monitoring the sensor data and a second set of predictive factors associated with the secondary participant, the training data identifying historical effectiveness of the play of the primary participant, and the weighting factors, wherein the volume of effectiveness for the secondary participant represents a volume surrounding the secondary participant in which the secondary participant is considered to be effective;
program instructions to forecast a rate of change of the first set of predictive factors;
program instructions to determine the volume of the volume of effectiveness for the primary participant based on the forecasted rate of change of the first set of predictive factors; and
program instructions to select a shape for the determined volume of the volume of effectiveness by utilizing a support vector machine which receives the forecasted rate of change of the first set of predictive factors,
wherein the program instructions are stored on the computer readable storage medium for execution by the processor via the computer readable memory.

20. The system of claim 19, further comprising: program instructions to determine and display a narrative describing the volume of effectiveness for the primary participant, the volume of effectiveness for the secondary participant, or suggested actions using natural language generation; and program instructions to generate an audio narrative that describes at least one situation that is based on the real-time region of effectiveness and the real-time predictive factors corresponding to the real-time region of effectiveness.

21. The system of claim 19, further comprising:
determining real-time predictive factors for the secondary participant that minimizes the real-time region of effectiveness of the secondary participant,
the real-time predictive factors for the secondary participant comprises a trajectory of the secondary participant, a momentum of the secondary participant, and an orientation of the secondary participant, and
the primary participant is an athlete of the sporting event, the secondary participant is an opponent athlete, and the sporting event is tennis.

22. A computer-implemented method comprising:
generating, by a computing device, a plurality of training data records for a participant of a sporting event, wherein the training data records each identify a measure of effectiveness of a play made by the participant, and a dataset of historical predictive factors associated with each measure of effectiveness;
monitoring, by the computing device, sensor data of the sporting event in real-time;
determining, by the computing device, datasets of real-time predictive factors for the participant from the sensor data in real-time, the real-time predictive factors comprise a trajectory of a ball;
training, by the computing device, a machine learning system using machine learning on data which identifies historical effectiveness of the play of the participant;

determining, by the computing device, weighting factors based on the training data which identifies the historical effectiveness of the play of the participant, wherein the weighting factors comprise a first factor for adjusting a radius for an athlete volume of effectiveness within the training data and a second factor for adjusting a height of the athlete volume of effectiveness within the training data;

dynamically determining, by the computing device, real-time volumes of effectiveness for the participant over a period of time during the sporting event based on the datasets of real-time predictive factors, the training data identifying historical effectiveness of the play of the participant, the weighting factors, and the plurality of training data records;

outputting, by the computing device, the real-time volumes of effectiveness for displaying the real-time volumes of effectiveness superimposed over and around a video image of the participant, wherein the volumes of effectiveness change based on changes to the real-time predictive factors during the sporting event;

forecasting, by the computing device, a rate of change of the real-time predictive factors;

determining, by the computing device, a volume of the real-time volumes of effectiveness for the participant based on the forecasted rate of change of the real-time predictive factors; and selecting, by the computing device, a shape for the determined volume of the real-time volumes of effectiveness by utilizing a support vector machine which receives the forecasted rate of change of the real-time predictive factors.

23. The computer-implemented method of claim 22, further comprising:

generating an audio narrative that describes at least one situation that is based on the real-time region of effectiveness and the real-time predictive factors corresponding to the real-time region of effectiveness, wherein the real-time volumes of effectiveness are each in the form of a cylinder having a particular volume, wherein a radius of the particular volume of the cylinder is determined based on a first regression equation and a height of the cylinder is based on a second regression equation.

24. The computer-implemented method of claim 22, further comprising:

determining real-time predictive factors for a second participant that minimizes a real-time region of effectiveness of the second participant, the real-time predictive factors for the second participant comprises a trajectory of the second participant, a momentum of the second participant, and an orientation of the second participant, and each of the datasets of real-time predictive factors include at least one selected from the group consisting of:

position or orientation of a body of the participant;
position of the participant on a court;
the participant's momentum;
the participant's speed;
the participant's trajectory;
the participant's acceleration;
a trajectory of a ball; and
the participant's biometrics data.

* * * * *